United States Patent [19]

Ogi et al.

[11] Patent Number: 5,419,197
[45] Date of Patent: May 30, 1995

[54] MONITORING DIAGNOSTIC APPARATUS USING NEURAL NETWORK

[75] Inventors: Hiromi Ogi; Hideo Tanaka; Yoshiakira Akimoto, all of Tokyo; Yoshio Izui, Hyogo, all of Japan

[73] Assignee: Mitsubishi Denki Kabushiki Kaisha, Tokyo, Japan

[21] Appl. No.: 28,822

[22] Filed: Mar. 10, 1993

[30] Foreign Application Priority Data

Jun. 2, 1992 [JP] Japan .................................. 4-141564

[51] Int. Cl.$^6$ ........................................... G01H 17/00
[52] U.S. Cl. ..................................... 73/659; 395/21; 395/23; 395/24; 364/551.01; 364/550; 73/658
[58] Field of Search ................. 307/201, 464; 364/550, 364/551.01; 395/21, 22, 23, 24; 73/587, 658, 659

[56] References Cited

U.S. PATENT DOCUMENTS

| | | | |
|---|---|---|---|
| 5,165,270 | 11/1992 | Sansalone et al. | 73/594 |
| 5,305,235 | 4/1994 | Izui et al. | 395/24 |
| 5,306,893 | 4/1994 | Morris et al. | 395/22 |
| 5,309,379 | 5/1994 | Rawlings et al. | 364/578 |

FOREIGN PATENT DOCUMENTS 2073385  1/1993  Canada .

OTHER PUBLICATIONS

"Preventive Maintenance System for Gas Insulated Switchgear Using an Artificial Neural Network" Hiromi Ogi et al. Third Symposium on Expert Systems Application to Power Systems; Japan; pp. 627–633 Apr. 1–5 1991.
"Fault Diagnosis System for GIS Using an Artificial Neural Network"; Ogi et al.; Proceedings on the First International Forum on Applications to Neural Networks to Power Systems; Seattle, Washington, pp. 112–116; Jul. 23–26 1991.
T. Yamagiwa et al., "Development of Preventive Maintenance System for Highly Reliable Gas Insulated Switchgear", published by the Power Engineering Society, *IEEE 90*, pp. 1–7.
F. Endo et al., "Development of Preventive Maintenance System for Highly Reliable Gas Insulated Switchgear", *IEEE Transactions on Power Delivery*, vol. 6, No. 2, Apr. 1991, pp. 840–848.
M. Boek, "Experiments in the Application of Neural Networks to Rotating Machine Fault Diagnosis", *IEEE International Joint Conference on Neural Networks*, vol. 1, Nov. 18, 1991, Singapore, pp. 769–774.
N. Kandil et al., "Fault Identification in an AC-DC Transmission System Using Neural Networks", *IEEE Transactions on Power Systems*, vol. 7, No. 2, May 1992, pp. 812–819.
T. Kawada et al., "Predictive Maintenance Systems for Substations", *Proceedings of the 3rd International Conference on Properties and Applications of Dielectric Materials*, vol. 2, Jul. 8, 1991, Tokyo, Japan, pp. 1144–1148.
Patent Abstracts of Japan, vol. 15, No. 79, JP-A-02 296 162, (P-1170) (4607), Feb. 25, 1991.

Primary Examiner—Hezron E. Williams
Assistant Examiner—Rose M. Finley
Attorney, Agent, or Firm—Burns, Doane, Swecker & Mathis

[57] ABSTRACT

A monitoring diagnostic apparatus for detecting an abnormality occurring in an object being monitored such as electrical equipment and determining the cause of the abnormality is disclosed. First of all, vibration or partial discharge occurring in the monitored object is detected by using a sensor installed in close proximity to the monitored object. A detection signal output by the sensor then undergoes predetermined signal processing such as the Fourier transform and normalization. After the predetermined signal processing is completed, a neural network identifies the abnormality occurring in the monitored object and determining the cause of the abnormality. The neural network carries out a learning process based on causes of abnormalities occurring in the monitored object, outputting signals corresponding to the causes of the abnormalities.

1 Claim, 14 Drawing Sheets

5,419,197

MONITORING DIAGNOSTIC APPARATUS USING NEURAL NETWORK

BACKGROUND OF THE INVENTION

1. Field of the Invention

The present invention relates to a monitoring diagnostic apparatus for monitoring abnormalities or determining/predicting causes of abnormalities of electrical equipment such as circuit breakers, switches, disconnecting switches, voltage transformers, current transformers, general transformers, bus bars, insulation meters, generators, rotary machines, oil-insulated electrical equipment, air-insulated electrical equipment, vacuum-insulated electrical equipment and solid-insulated electrical equipment.

2. Description of the Prior Art

FIG. 17 is a diagram showing the configuration of a monitoring diagnostic apparatus adopting a technique described in a report with the title "Development of Preventive Maintenance System for Highly Reliable Gas-Insulated Switchgear" with reference to FIG. 4 on page 4 of *Power Engineering Society* presented in an IEEE winter meeting in 1990.

Reference numeral 1 shown in FIG. 17 is electrical equipment such as a spacer of a circuit breaker whereas reference numeral 2 denotes a tank of the circuit breaker 1. Reference numerals 3 and 4 are a central conductor of the circuit breaker 1 and a transmission line to the circuit breaker 1, respectively. Reference numeral 5 is a foreign substance sticking to the central conductor 3 whereas reference numeral 6 denotes a partial-discharge phenomenon caused by the foreign substance 5. Reference numerals 7 and 74 are an acceleration sensor attached to the tank 2 and an ultrasonic sensor, respectively. Reference numeral 75 denotes a processor for dividing an output A of the acceleration sensor 7 by an output B of the ultrasonic sensor 74 to give a result C. Reference numeral 76 is a comparator for determining whether or not the result C is greater than a predetermined threshold value Th. The processor 75 and the comparator 76 constitutes a controller denoted by reference numeral 77 for implementing a monitoring diagnostic algorithm. Reference notation D is a monitor diagnostic result.

Next, the principle of operation of the monitoring diagnostic apparatus is described. First of all, the processor 75 computes the value C (=A/B) as a ratio of the output A of the acceleration sensor 7 to the output B of the ultrasonic sensor 74. The value of the ratio C is then supplied to the comparator 76 to be compared to the threshold value Th. A ratio value C greater than the threshold value Th is regarded as a symptom of an abnormality occurring in the circuit breaker 1. A ratio value C smaller than the threshold value Th, on the other hand, is regarded as a noise. It should be noted that the threshold value Th is determined in advance by experiments or from previous experiences.

In the conventional monitoring diagnostic apparatus described above, an algorithm is adopted for detecting an abnormality. According to the algorithm, the value C, a ratio of outputs of two kinds of sensors, is compared to the threshold value Th. A ratio value C greater than the threshold value Th is regarded as a symptom of an abnormality. It is thus necessary to determine in advance the threshold value Th by experiments or from previous experiences. In addition, the conventional monitoring diagnostic apparatus cannot adapt itself to changes in case of the circuit breaker, various kinds of noise differing from installation site to installation site or changes with the lapse of time.

Moreover, two kinds of sensors are employed. The sensors give rise to a problem that in some cases only one sensor can be installed. If three or more sensors are used, the range of applications becomes even narrower because the conventional monitoring diagnostic apparatus cannot make use of information output by the additional sensors. In addition, the conventional monitoring diagnostic apparatus has a problem that the conventional algorithm employed therein provides only information on whether the electrical equipment is normal or abnormal. The cause of a detected abnormality cannot thereby be identified.

SUMMARY OF THE INVENTION

It is an object of the present invention to solve the problems described above by providing a monitoring diagnostic apparatus that can provide information on whether its monitored electrical equipment is normal or abnormal, identify the cause of a detected abnormality, be applied to any number of sensors regardless of their types and further adapt itself with a high degree of flexibility to the types of the electrical equipment, conditions of its installation sites as well as changes with the lapse of time.

In order to achieve the object described above, the monitoring diagnostic apparatus provided by the present invention for detecting abnormalities of an object being monitored such as electrical equipment is installed in close proximity to the monitored object. The monitoring diagnostic apparatus is equipped with sensors for monitoring, among other things, the acceleration of the monitored object, a signal processing means for executing predetermined signal processing on outputs of the sensors, and a neural network for inputting signals undergoing the signal processing at the signal processing means, determining whether the monitored object is normal or abnormal and identifying the cause of a detected abnormality. The neural network learns by experience with causes of abnormalities encountered so far. Identifying the cause of a detected abnormality, the neural network outputs a corresponding signal.

As a result, the monitoring diagnostic apparatus can not only determine whether the electrical equipment, which it is monitoring, is normal or abnormal, but can also judge that an abnormal state corresponding to its neural element has been resulted in at the electrical equipment. In addition, the neural network undergoes a learning process based on data which is collected while the monitoring diagnostic apparatus is operating. Accordingly, the monitoring diagnostic apparatus can adapt itself to the changing conditions of the installation site of the electrical equipment and changes with the lapse of time.

DETAILED DESCRIPTION OF THE PREFERRED EMBODIMENTS

The present invention will become apparent from the following detailed description of preferred embodiments with reference to accompanying diagrams.

First Embodiment

Figure 1:
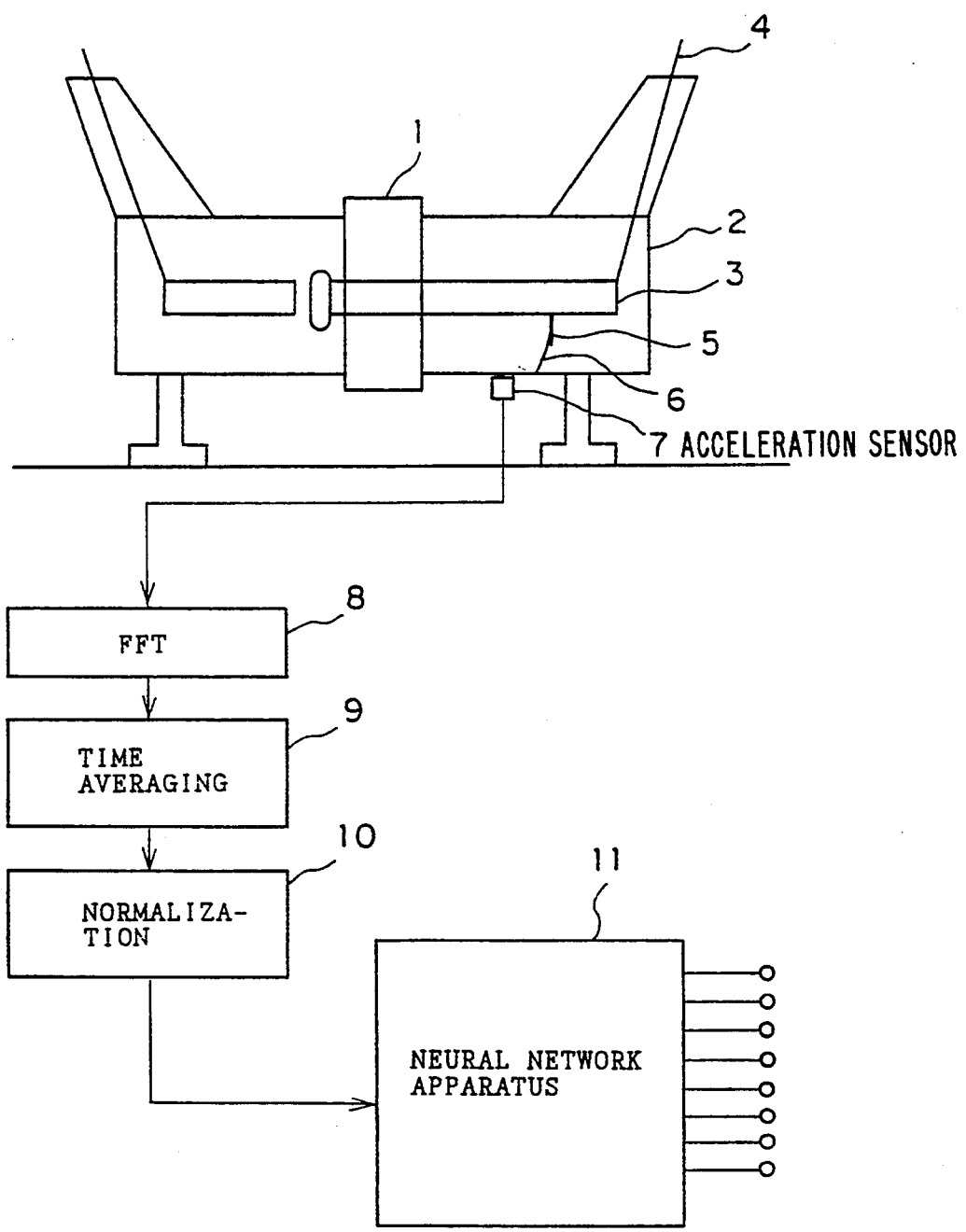
FIG. 1 is a diagram showing the configuration of a first embodiment implementing a monitoring diagnostic apparatus in accordance with the present invention.
Figure 17:
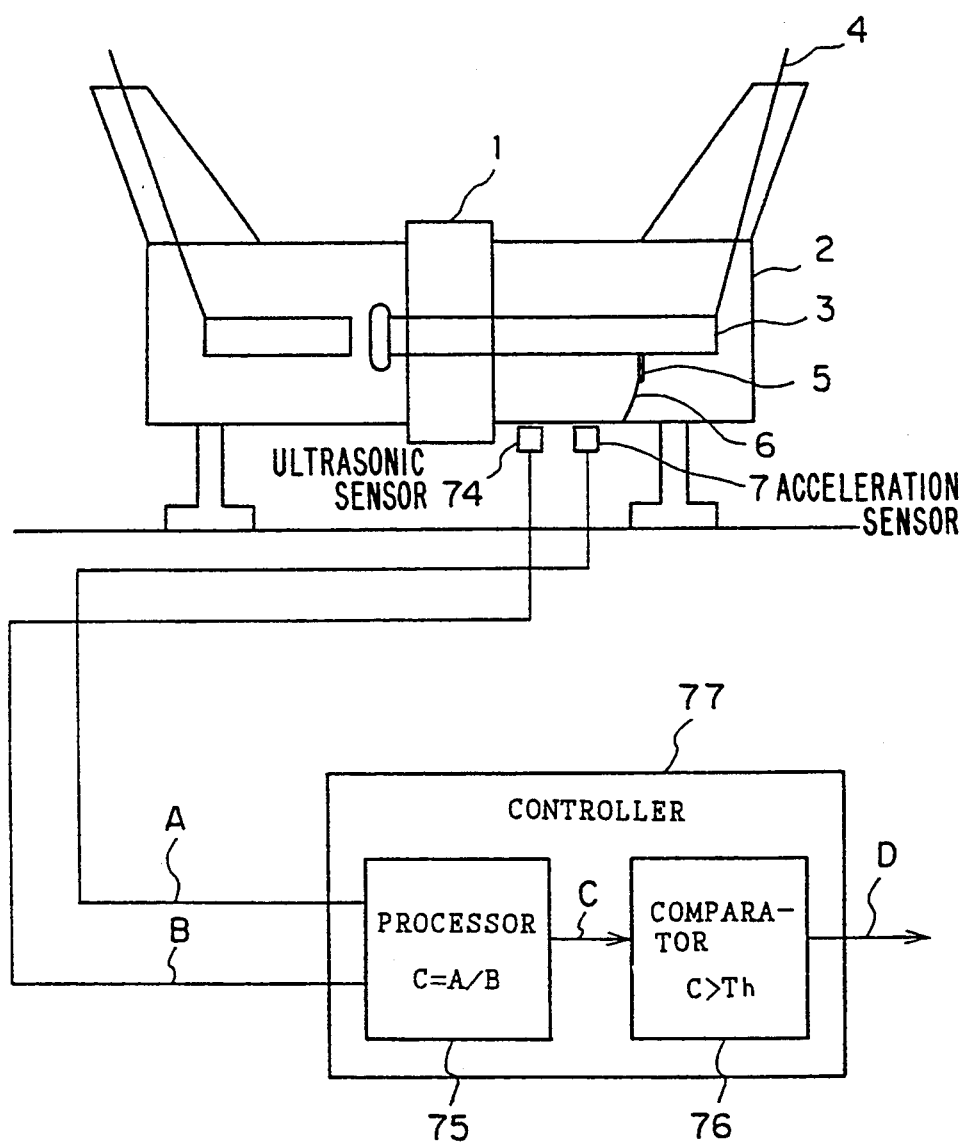
FIG. 17 is a diagram showing the configuration of conventional monitoring diagnostic apparatus.

FIG. 1 is a diagram showing the configuration of a first embodiment implementing a monitoring diagnostic apparatus in accordance with the present invention. In the figure, the same reference numerals as those in FIG. 17 are used to denote the same components employed in the conventional monitoring diagnostic apparatus shown in FIG. 17. Description of the same components as the conventional ones is omitted.

If a partial-discharge phenomenon 6 occurs, the internal insulating gas vibrates and the vibration propagates to the tank 2.

As a result, the tank 2 also mechanically vibrates, varying the acceleration. Variations in acceleration are, in turn, detected by an acceleration sensor 7. Detecting the variations in acceleration, the acceleration sensor 7 outputs a time wave form which is converted into a spectrum by a processor 8 by means of the FFT (Fast Fourier Transform). A processor 9 then computes its time average.

A processor 10 further performs some processing including normalization of its magnitude which is then supplied to a neural network apparatus 11. Based on an output of the neural network apparatus 11, the normal or abnormal state of the circuit breaker is determined.

It should be noted that in this embodiment, even though the processors 8 to 10 and the neural network apparatus 11 are described as pieces of hardware physically separated from each other, they can also be actually implemented as software executed by, for example, a portable general-purpose digital computer.

Figure 2:
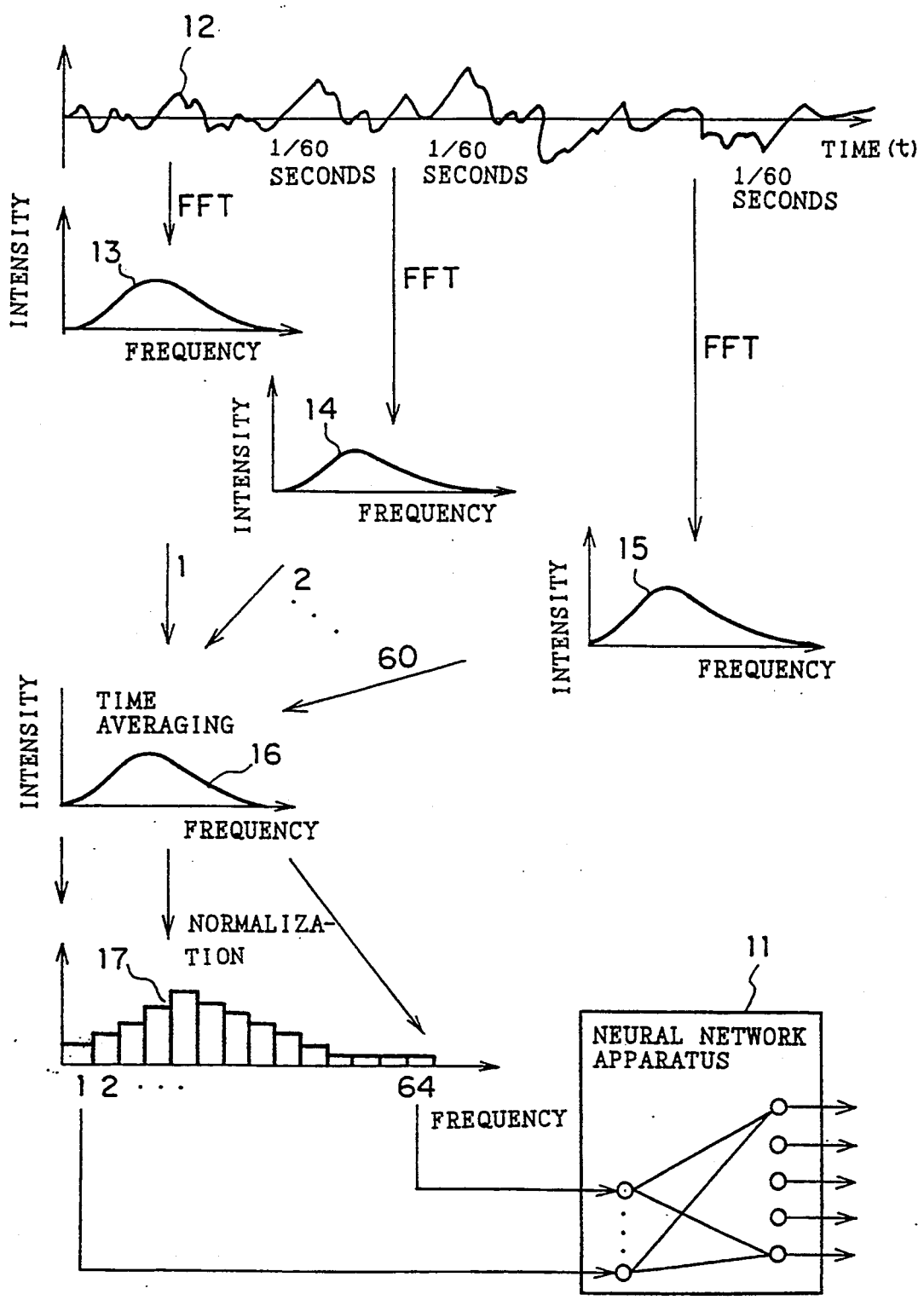
FIG. 2 is an explanatory diagram showing detailed operations of processors 8, 9 and 10 employed in the first embodiment shown in FIG. 1.

FIG. 2 is an explanatory diagram showing detailed operations of the processors 8, 9 and 10 employed in the first embodiment shown in FIG. 1. A wave form 12 shown in this figure is a typical output of the acceleration sensor 7. The wave form 12 expresses the sensor output's variations in magnitude with the lapse of time which is represented by the abscissa. In this case, the frequency of the power system is 60 Hz, resulting in a period of 1/60 seconds. The wave form 12 is sliced every period or every 1/60 seconds and each slice undergoes the FFT processing in the processor 8 to give spectra represented by wave forms 13, 14 and 15. The figures showing the wave forms 13, 14 and 15 are drawn with axes of abscissas and ordinates representing the intensity and frequency, respectively. Sixty spectra per second are obtained. The spectra are averaged by the processor 9 to yield a wave form 16. In the processing shown in FIG. 2, an average of 60 spectra representing a wave form in a time period of 1 second is computed.

Next, the frequency axis is divided into typically 64 segments which are obtained through a lower frequency resolution. Intensities in the 64 frequency segments are regarded as components of a 64-dimensional vector. A graph 17 shows normalized intensities which are computed to yield a vector norm of unity.

Subsequently, the normalized spectra for the 64 frequency segments are each supplied to a corresponding neural element on an input layer of the neural network apparatus 11. It should be noted that even though the wave form 12 is sliced and converted into spectra contiguous along the time axis as shown in the figure, the wave form 12 does not have to be cut off into continuous slices. The wave form 12 can also be sliced into portions separated by appropriate gaps on the time axis. In addition, the portion of the wave form 12 to be sliced is not necessarily one corresponding to one period. The portion can be of any length and does not have to be synchronous with the frequency of the power supply.

Figure 3:
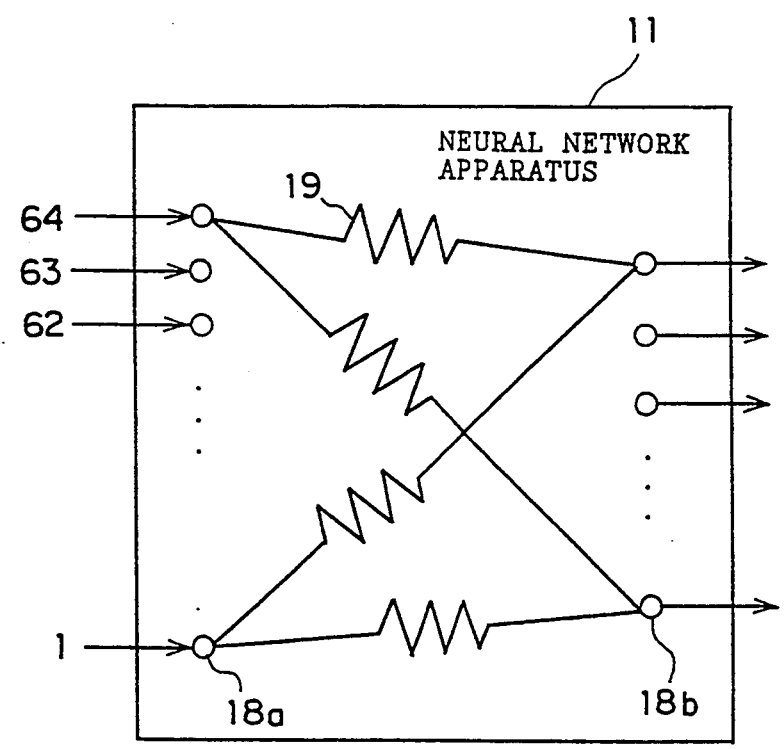
FIG. 3 is a diagram showing a detailed configuration of a neural network apparatus 11 employed in the first embodiment.

FIG. 3 is a diagram showing a detailed configuration of a neural circuit network apparatus 11. Reference numerals 18a and 18b are neural elements of input and output layers, respectively. Reference numeral 19 denotes a connectivity weight connecting the two input and output layers. Normalized spectra of the acceleration sensor 7 are supplied to neural elements 18a of the input layer, the number of which is typically 64. The spectra undergo a computing process in the right direction, to give final results at the neural elements 18b of the output layer.

Figure 4:
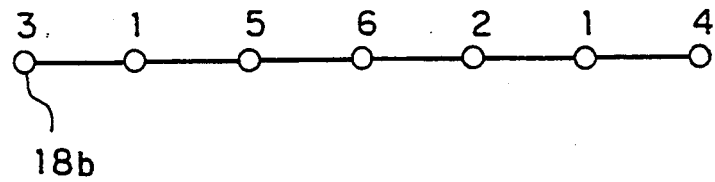
FIG. 4 is an explanatory diagram showing neural elements of an output layer of the neural network apparatus 11 employed in the first embodiment which are aligned along a one-dimensional line.
Figure 5:
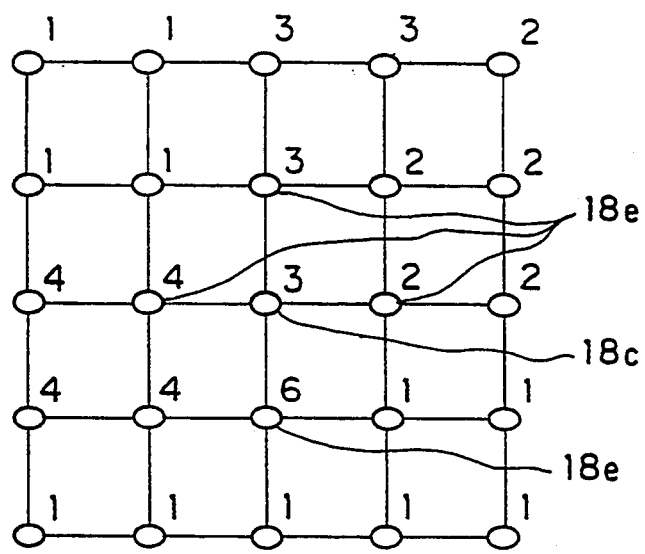
FIG. 5 is an explanatory diagram showing neural elements of an output layer of the neural network apparatus 11 employed in the first embodiment which are laid out into a two-dimensional lattice form.

FIG. 4 is an explanatory diagram showing the neural elements 18b of the output layer of the neural network apparatus 11 which are aligned along a one-dimensional line. FIG. 5 is an explanatory diagram showing the neural elements of the output layer of the neural network apparatus 11 which are laid out into a two-dimensional lattice form. As shown in the figures, there are 7 neural elements 18b on the one-dimensional line, and 25 (5×5) neural elements exist on the two-dimensional lattice.

A label is associated with an output-layer neural element 18b to denote an abnormality cause which is obtained in a learning process. For example, the following labelling is embraced for the output-layer neural elements 18b of FIGS. 4 and 5. Labels 1 to 6 denote 6 different normal and abnormal states: a normal state, a foreign substance sticking on a central conductor, a foreign substance sticking on the wall inside the tank, a straying foreign substance, bad contact on the central contact point of the central conductor and bad contact on both end electrodes of the central conductor. It should be noted that not all connectivity weights 19 are shown in FIG. 3 in order to make the figure easy to understand. Actually, all the neural elements 18a of the input layer are each connected to all the neural elements 18b of the output layer through the connectivity weights 19.

Figure 6:
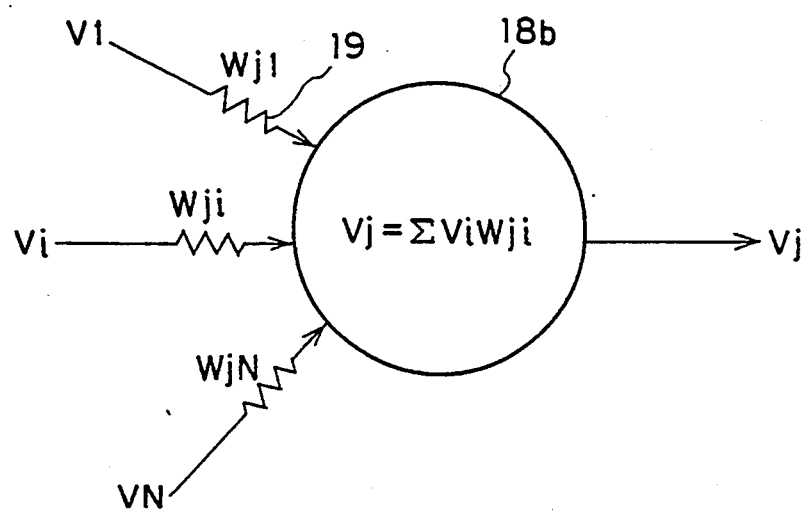
FIG. 6 is an explanatory diagram showing a detailed configuration of a neural element 18b of the output layer in the first embodiment.

FIG. 6 is an explanatory diagram showing a detailed configuration of a neural element 18b of the output layer. Let reference symbol j denote an output-layer neural element 18b of interest. The output-layer neural element j is connected to input-layer neural elements i through connectivity weights $W_{ji}$, where i=1 to N. An output $V_j$ of the output-layer neural element j is given by Equation (1) as an inner product obtained by multiplying outputs $V_i$ of the input-layer neural elements i by the connectivity weights $W_{ji}$.

Next, a neural element producing a maximum output is selected among the output-layer neural elements 18b. A label associated with the selected output-layer neural element denotes a normal or abnormal state as described earlier. For example, let the output-layer neural element at the upper left corner shown in FIG. 5 produce the maximum output. Label 1 associated with this output-layer neural element denotes abnormality 1 which happens to be a normal state. It should be noted that the input-layer neural elements 18a each serve merely as a buffer which outputs a value supplied thereto as it is.

$$V_j = \Sigma_i W_{ji} V_i \tag{1}$$

It should also be noted that the operations described above are carried out for unknown spectra supplied to the neural network apparatus 11. In some cases, unknown spectra are hereafter called unknown data. In a learning process, abnormality causes having known spectra are acquired in advance. Hereafter, known spectra may also be referred to as learning data.

In a learning process, known spectra are supplied to the neural network apparatus 11 in order to find the values of the connectivity weights by using, among other things, the contention learning. The learning data is then resupplied to the neural network apparatus 11 in order to find a neural element of the output layer that produces a maximum output. A label denoting an abnormality cause of the known spectra, that is, an abnormality cause associated with the learning data, is associated with the neural element with the maximum output.

Typical contention-learning algorithms include Kohonen's self-organizing learning algorithm and the LVQ. The self-organizing learning algorithm is executed as follows. Let t be the number of learning repetitions and $W_j(t)$ be a vector symbol expressing the connectivity weights of a neural element j. Let X be a known spectrum or learning data, the output of a neural element of the input layer. Let c be the number of a neural element of the output layer which produces a maximum output from the learning data. Let $N_c(t)$ represent neural elements in the neighborhood of the neural element c. In this case, the learning process is carried out in accordance with Equation (2) shown below. It should be noted that $a(t)$ appearing in Equation (2) is an appropriate coefficient.

By neural elements in the neighborhood of the neural element c, the following is meant. In the case of neural elements laid out in a two-dimensional lattice form shown in FIG. 5, for example, c is the number of a neural element denoted by reference numeral 18c. Here, if the neighborhood is defined to be the lattice-constant value 1, a neural element 18e and the neural element c itself belong to $N_c(t)$. In other words, the connectivity weights of a neural element in the neighborhood of the neural element producing the maximum output are corrected in accordance with Equation (2). The magnitudes of the neighborhood and the coefficient $a(t)$ are gradually made smaller as the learning process is repeatedly carried forward.

$$W_j(t+1) = W_j(t) + a(t)[X - W_j(t)]_j \in N_c(t)$$
$$\|X - W_c(t)\| = \min_i \{\|X - W_i(t)\|\} \tag{2}$$

In this first embodiment, the connectivity weights 19 corrected during the learning process and stored in the neural network apparatus 11 represent relations between spectra and their corresponding abnormality causes. When spectra of an unknown acceleration sensor are input, a neural element associated with the abnormality cause corresponding to the spectra produces a maximum output. As a result, not only can whether the electrical equipment such as a gas-insulated circuit breaker is normal or abnormal be determined, but it is also possible to identify an abnormal state of the electrical equipment corresponding to the label associated with a neural element 18b of the ouput-layer.

In addition, the neural network apparatus collects learning data, undergoing a learning process during the normal operation. In this way, the neural network apparatus can adapt itself to the changing conditions of the installation site and changes with the lapse of time of the electrical equipment. Furthermore, various types of electrical equipment such as gas-insulated circuit breakers can be all handled satisfactorily by using entirely the same configuration of the neural network apparatus 11 itself. This is because the neural network apparatus 11 undergoes a learning process by acquiring learning data appropriate for the type of the electrical equipment.

Second Embodiment

Figure 7:
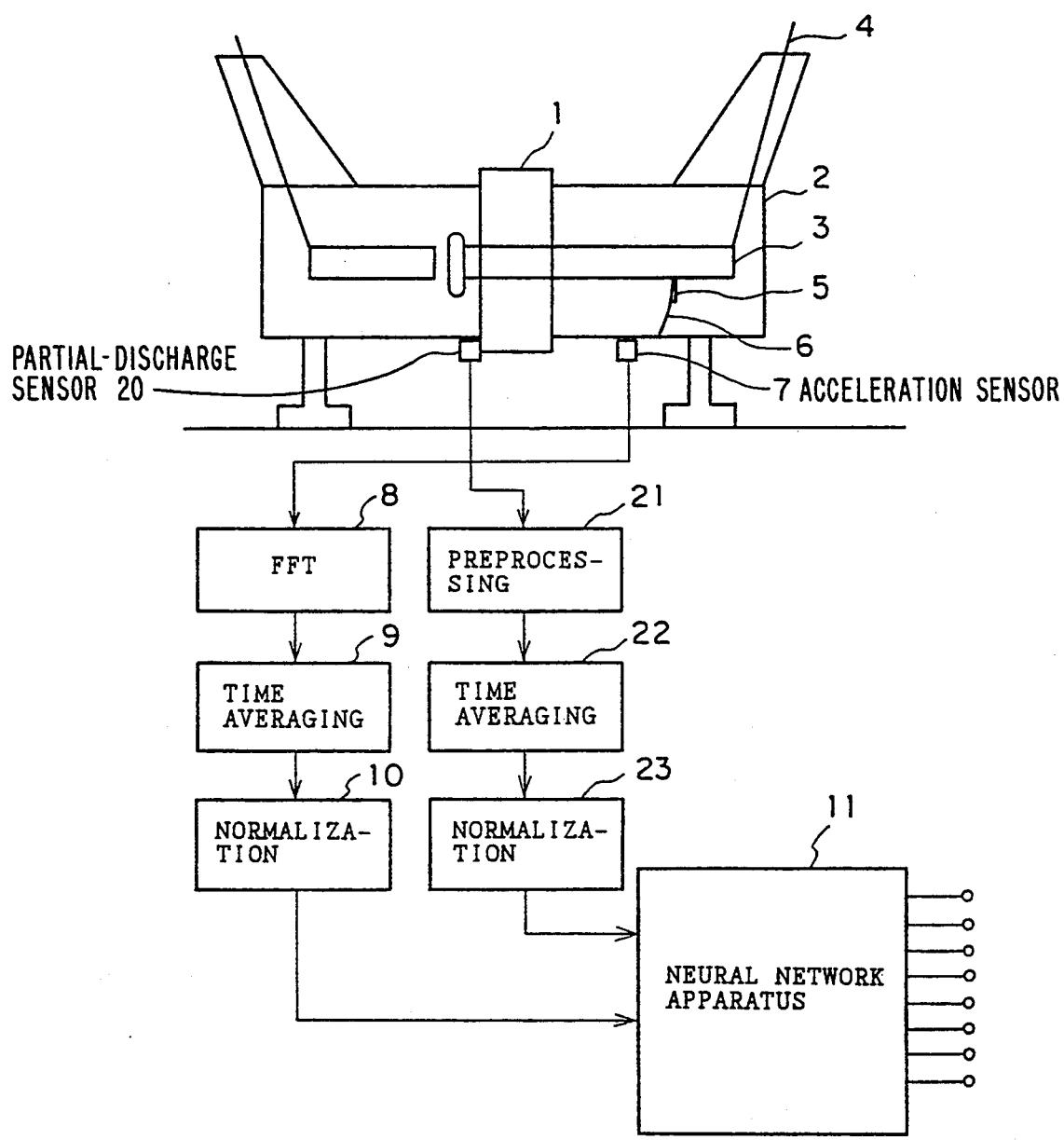
FIG. 7 is a diagram showing the configuration of a second embodiment implementing a monitoring diagnostic apparatus in accordance with the present invention.

FIG. 7 is a diagram showing the configuration of a second embodiment implementing a monitoring diagnostic apparatus in accordance with the present invention. In addition to the output of the acceleration sensor 7 shown in FIG. 1, the output of a partial-discharge sensor 20 is utilized in this second embodiment. The partial-discharge sensor 20 is attached to a tank 21 for detecting a potential rise of the tank 21 in the event of an abnormality occurring in the circuit breaker. The output produced by the partial-discharge sensor 20 is supplied to a processor 21, undergoing preprocessing therein. In a processor 22, a time-average process is then carried out. Subsequently, the processor 23 performs normalization by setting a vector norm to unity. Finally, the output of the processor 23 is supplied to the input layer of a neural network apparatus 11 along with the output of the acceleration sensor 7.

Figure 8:
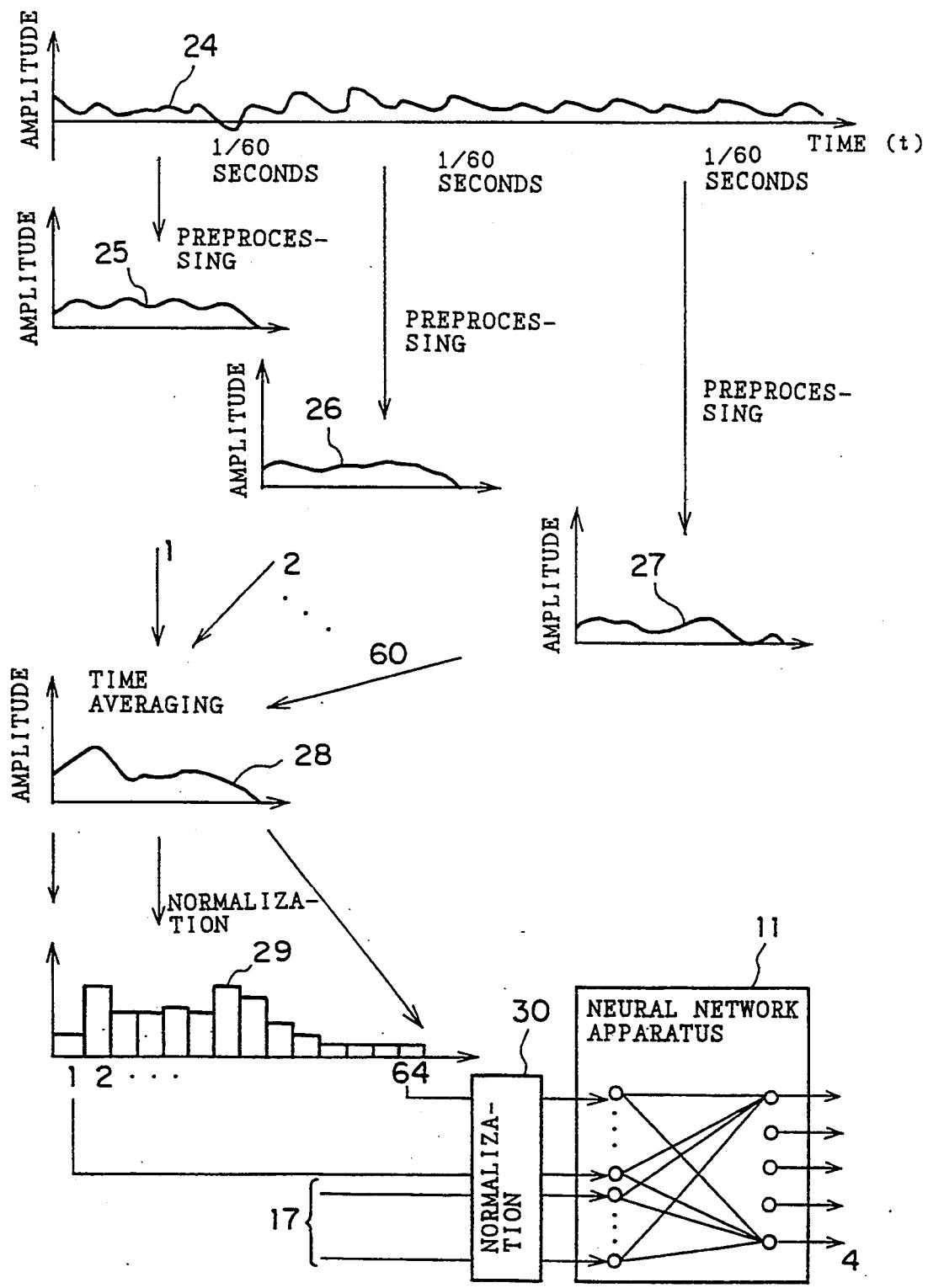
FIG. 8 is an explanatory diagram showing detailed operations of processors 21, 22 and 23 employed in the second embodiment shown in FIG. 7.

FIG. 8 is an explanatory diagram showing detailed operations of the processors 21, 22 and 23 employed in the second embodiment shown in FIG. 7. Reference numeral 24 shown in FIG. 8 is a wave form output by the partial-discharge sensor 20. The wave form is drawn with the abscissa representing the lapse of time and the ordinate representing changes in output magnitude with the lapse of time. In this case, the frequency of the power system is 60 Hz. The wave form output by the partial-discharge sensor 20 is sliced into portions with each portion having a length of one cycle. That is to say, the wave form is cut at one-period (1/60-second) intervals. Wave forms 25, 26 and 27, the sliced output, then undergo the preprocessing in the processor 21. For example, 60 pieces of sliced portions are obtained in 1 second. Subsequently, the processor 22 computes a sum of the 60 sliced portions in order to derive an average which is expressed by a wave form 28.

Next, the time t represented by the axis of abscissas is divided into 64 segments having the same length. The magnitudes of the 64 portions are treated as components of a vector, the norm of which is normalized to unity. That is to say, spectra produced by the partial-discharge sensor 20 are processed to give normalized quantities with a norm of unity before being supplied to input-layer neural elements of the neural network apparatus 11. Operations thereafter are the same as the first embodiment. It should be noted that the number of input-layer neural elements employed in the neural network apparatus 11 is equal to the sum of the number of partial-discharge sensors 20 and the number of acceleration sensors 7. For example, if the number of partial-discharge sensors 20 is 64 and the number of acceleration sensors 7 is 64, the number of the input-layer neural elements is 128. The wave form is continuously sliced every 1/60 seconds as shown in FIG. 8. It should be noted, however, that the wave form does not have to be sliced continuously.

Figure 9:
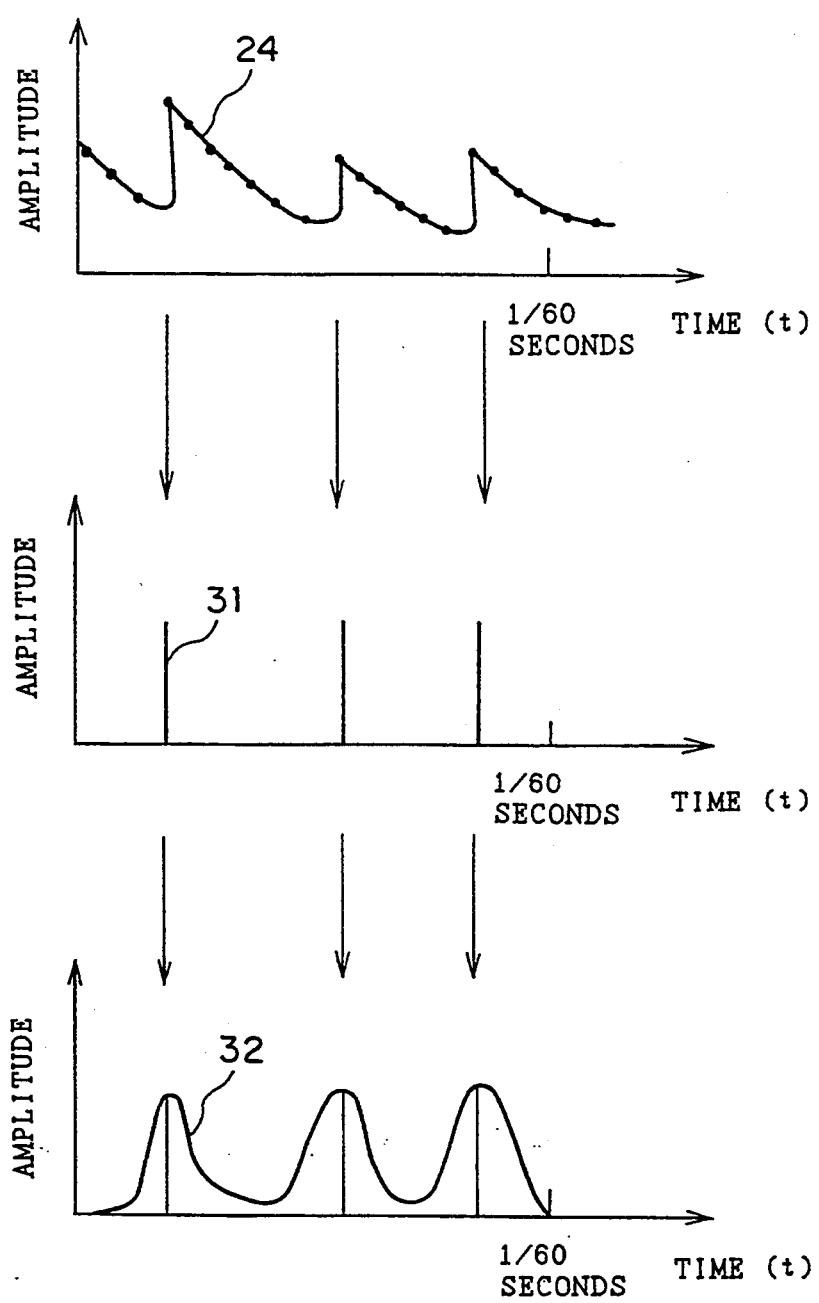
FIG. 9 is an explanatory diagram showing detailed preprocessing performed by the processor 21 of the second embodiment.

FIG. 9 is an explanatory diagram showing detailed preprocessing performed by the processor 21 of the second embodiment. Reference numeral 24 shown in the figure is a wave form output by the partial-discharge sensor 20. The black circles plotted on the wave form 24 each denote a sample point. By comparing the amplitudes of two consecutive sample points on the wave form 24, sample points with abrupt changes in amplitude can be detected as shown in a wave form 31.

Next, in order to absorb positional-variation errors, the sample points with abrupt changes in amplitude are shaded off typically by the Gauss distribution as shown in a wave form 32. Operations described in FIG. 9 are examples of the preprocessing. The graphs are drawn in the figure with abscissas and ordinates representing the lapse of time t and changes in amplitude with the lapse of time t, respectively. In the learning process, outputs from the partial-discharge sensors 20 are merely added to those of the acceleration sensors 7 to form learning data. The learning process itself is carried out in exactly the same way as the first embodiment.

In this embodiment, outputs of the partial-discharge and acceleration sensors 20 and 7 are supplied at the same time to the input-layer neural elements of the neural network apparatus 11 in order to identify an abnormal state. In this way, it is thus possible to identify an abnormal state that cannot be recognized by the acceleration sensors 7 alone. If new sensors are employed, their outputs are used in the same way as the addition of the information output by the partial-discharge sensors 20 to that of the acceleration sensors 7. That is, by supplying information output by the new sensors to the input-layer neural elements of the neural network apparatus 11, the capability of identifying an abnormal state can be enhanced.

As shown in FIG. 8, pieces of information output by the acceleration and partial-discharge sensors 7 and 20 are supplied to the neural network apparatus 11 at the same time. It should be noted, however, that the learning process can be performed by using only the information output by the partial-discharge sensor 20 in exactly the same way. In addition, with only one sensor output used, it is not necessary to carry out normalization.

Third Embodiment

Figure 10:
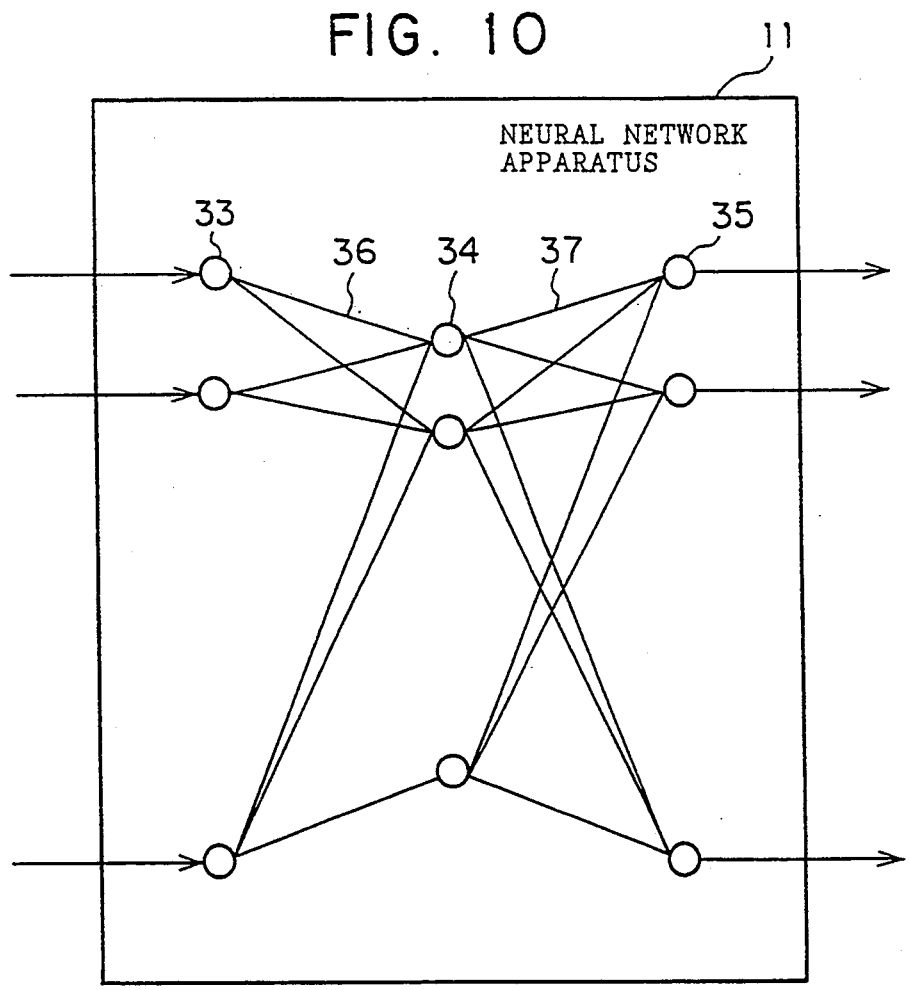
FIG. 10 is a diagram showing a detailed configuration of a neural circuit network apparatus 11 employed in a third embodiment implementing a monitoring diagnostic apparatus in accordance with the present invention.

FIG. 10 is a diagram showing a detailed configuration of a neural circuit network apparatus 11 employed in still another embodiment, a third embodiment, implementing a monitoring diagnostic apparatus in accordance with the present invention. Processings such as the FFT, time averaging, normalization and preprocessing are carried out in exactly the same way as the embodiments described earlier. The only difference from the previous embodiments is the learning algorithm.

Figure 11:
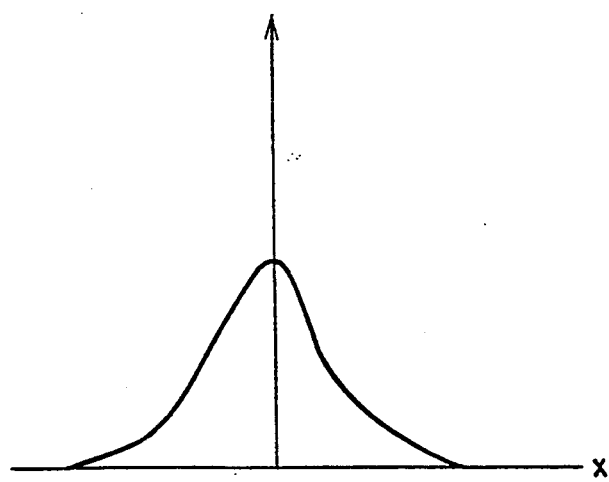
FIG. 11 is an explanatory diagram showing an input-output characteristic of a neural element of an intermediate layer in the monitoring diagnostic apparatus implemented by the third embodiment.

As shown in the figure, outputs of the acceleration and partial-discharge sensors are supplied to input-layer neural elements 33 after undergoing the FFT and normalization processings. The input-layer neural elements 33 serve merely as buffers, outputting the pieces of information supplied thereto as they are. Here, the inputs to the input-layer neural elements 33 or the outputs of the sensors, and the outputs of the input-layer neural elements 33 are expressed as a vector x. Intermediate-layer neural elements 34 have typically a Gauss input-output relation expressed by Equation (3). FIG. 11 is an explanatory diagram showing the input-output characteristic of a neural network 34 of the intermediate layer in the monitoring diagnostic apparatus 11 implemented by the third embodiment.

$$y = g(x;\sigma) = \exp(-(x/\sigma)^2) \quad (3)$$

Next, let $W_{ji}$ be connectivity weights connecting intermediate-layer neural elements i to an output-layer neural element j. In this case, the input $V_{j,in}$ to an output-layer neural element j is given by Equation (4) as follows:

$$V_{j,in} = \Sigma_j W_{ji} g(x - \mu_i; \sigma_i) \quad (4)$$

where $\mu_i$ is a bias. The output-layer neural elements 35 also each serve as a buffer. Accordingly, the output $V_{j,out}$ of an output-layer neural element j is equal to its input $V_{j,in}$. It should be noted that, in general, a monotonous input/output characteristic such as the sigmoid function is good enough for use as a transfer characteristic of both the input and output-layer neural elements 33 and 35. After all, a function that outputs an input as it is is the simplest one.

A learning process is carried out in order to associate each of the output-layer neural elements 35 with an abnormality cause. In this way, with outputs of the sensors supplied to the neural network apparatus 11, an abnormality cause associated with an output-layer neural element producing a maximum output value can be identified. It should be noted that an abnormality cause can also be identified by supplying unknown spectra to the neural network apparatus 11. Unknown spectra may be called unknown data hereafter.

In a learning process, abnormality states with known spectra are acquired in advance by conducting, among other things, experiments. In some cases, known spectra are hereafter called learning data. Next, the known spectra are supplied to the neural network apparatus 11 to find parameters $\mu_i$ and $\sigma_i$ for the intermediate-layer neural elements and the connectivity weights $W_{ji}$ connecting the intermediate layer to the output layer. In this case, the steepest-descent method (saddle-point method) can be typically used.

Figure 12:
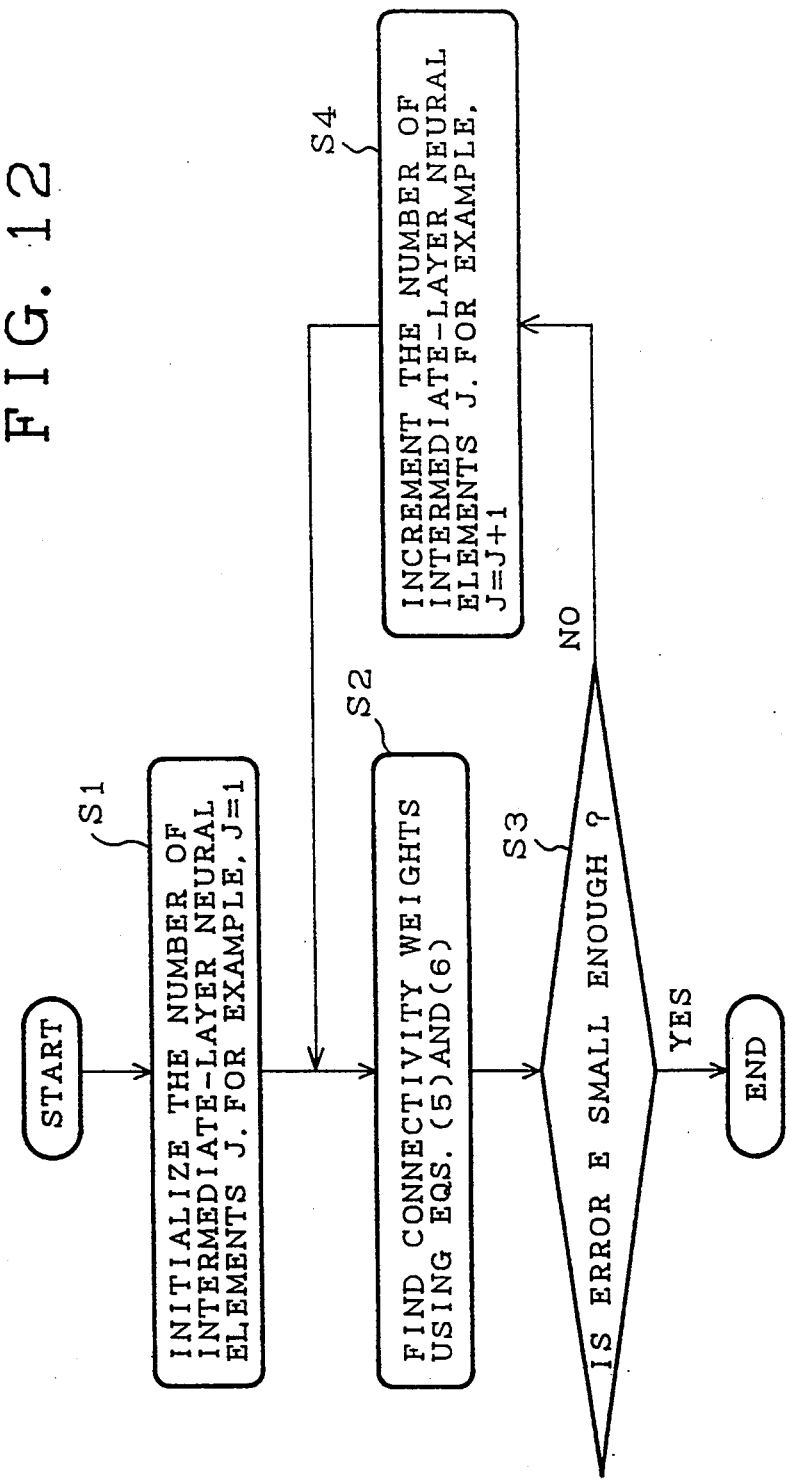
FIG. 12 is an explanatory flowchart showing a method of setting the number of neural elements of the intermediate layer in the monitoring diagnostic apparatus implemented by the third embodiment.

Here, let the number of abnormality causes be 6 and the number of intermediate-layer neural elements be J. Let $x^{(p)}$ be the Pth learning data or the outputs of the sensors and $T_j(P)$ be the correct solution to the learning data or the correct values produced by the output-layer neural elements. In this case, an error E for the whole learning data can be defined by Equation (5) as follows:

$$E = \Sigma_p(\tfrac{1}{2})\Sigma_j = I^\infty \{\Sigma_j = I^J W_{ji} x \exp(-(x^{(p)} - \mu_i)2/\sigma_i^2) - T_j^{(p)}\}^2 \quad (5)$$

where $x^{(p)}$ and $\mu_i$ are both vectors. Applying the steepest-descent method to the error E results in Equations (6) which give $W_{ji}$, $\mu_i$ and $\sigma_i$. It should be noted that in this case, the number of intermediate-layer neural elements J can be set arbitrarily. However, J is typically found by repeated calculation using the error E as shown in FIG. 12. That is to say, J is initially assumed for an error E that is regarded as acceptable. The learning process is performed by applying Equation (6) for the value J. Too large a value of the error E found in this way indicates a lack of intermediate-layer neural elements. In this case, the number of intermediate-layer neural elements J is incremented.

The process of finding the number of intermediate-layer neural elements J is also shown in FIG. 12. As shown in the figure, at a step S1, the number of intermediate-layer neural elements J is initialized, typically, to unity (J=1). At a step S2, the values of the connectivity weights are computed for the initial value of J by using Equations (6). At a step S3, the process determines whether or not the error E is sufficiently small. If the error E is small enough, the processing is terminated. Otherwise, the processing continues to a step S4 at which the number of intermediate-layer neural elements J is incremented typically by unity (J=J+1). The processing then returns to the step S2.

$$\Delta W_{ji} = -\alpha(\partial E/\partial W_{ji})$$

$$\Delta \mu_i = -\beta(\partial E/\partial \mu_i)$$

$$\Delta \sigma_i = -\gamma(\partial E/\partial \sigma_i) \quad (6)$$

Fourth Embodiment

Figure 13:
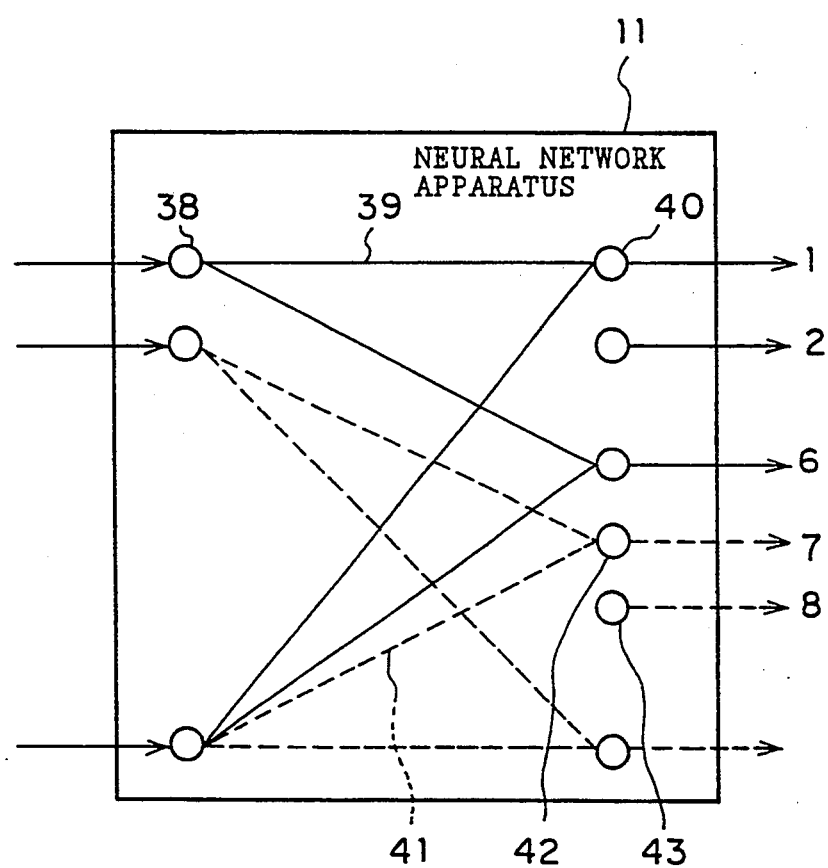
FIG. 13 is a diagram showing details of a neural network apparatus employed in a fourth embodiment implementing a monitoring diagnostic apparatus in accordance with the present invention.

FIG. 13 is a diagram showing details of a neural network apparatus 11 employed in a fourth embodiment implementing a monitoring diagnostic apparatus in accordance with the present invention. The neural network apparatus and the learning algorithm employed in the fourth embodiment are different from those of the previous embodiments shown in FIG. 1 or 7. However, the processings such as the FFT, time averaging, normalization and preprocessing are the same.

After undergoing the FFT and normalization processings, the outputs of the acceleration and partial-discharge sensors are supplied to the input-layer neural elements 38 as shown in FIG. 13. The neural elements 38 are buffers which forward inputs supplied thereto as they are. Thereafter, the outputs of the sensors supplied to the input-layer neural elements 38, which are output as they are, are in some cases expressed as a vector x.

Suppose, for example, that the neural network apparatus shown in FIG. 13 memorizes six abnormality causes by learning from known spectra. The six abnormality causes are assigned typically to output-layer neural elements 1 to 6 shown in FIG. 13. In the case of the neural network apparatus shown in FIG. 13, an abnormality cause is assigned to a neural element on a one-to-one basis. Depending upon the learning algorithm, however, an abnormality cause may be assigned to two or more output-layer neural elements.

An abnormality other than those memorized in the learning process may occur while the neural network apparatus 11 is operating. At that time, outputs of the sensors representing the unknown abnormality cause are supplied to the neural network apparatus 11. Let the unknown abnormality be an abnormality 7. In this case, the neural network apparatus 11 works as follows. Since the abnormality 7 is none of the abnormalities 1 to 6 memorized in the learning process, the neural network apparatus 11 creates a new output-layer neural element 42 by itself to which the cause of the abnormality 7 is assigned. If a new abnormality 8 different from the abnormalities 1 to 7 is further detected, a new output-layer neural element 43 is likewise self-created for assignment to the cause of the abnormality 8.

That is to say, prior to the actual operation, only connectivity weights shown by solid lines in FIG. 13 and the output-layer neural elements 1 to 6 are used. When the abnormalities 7 and 8 not known in the learning process are detected during the operation, the new output-layer neural elements 7 and 8 denoted by reference numerals 42 and 43 respectively are self-created one after another for assignment to the causes of the abnormalities 7 and 8 along with connectivity weights connecting the input-layer neural elements to the new neural elements 7 and 8 which are indicated by dashed lines in the figure.

In the case of the embodiment shown in FIG. 13, the behavior of the neural network apparatus follows exactly the same algorithm as the learning process. In other words, the very same algorithm is used regardless of whether the neural network apparatus 11 is in the learning-process or operational mode. The algorithm embraced by the embodiment is called the learning algorithm, a generic name, the outline of which is shown in FIG. 14.

Figure 14:
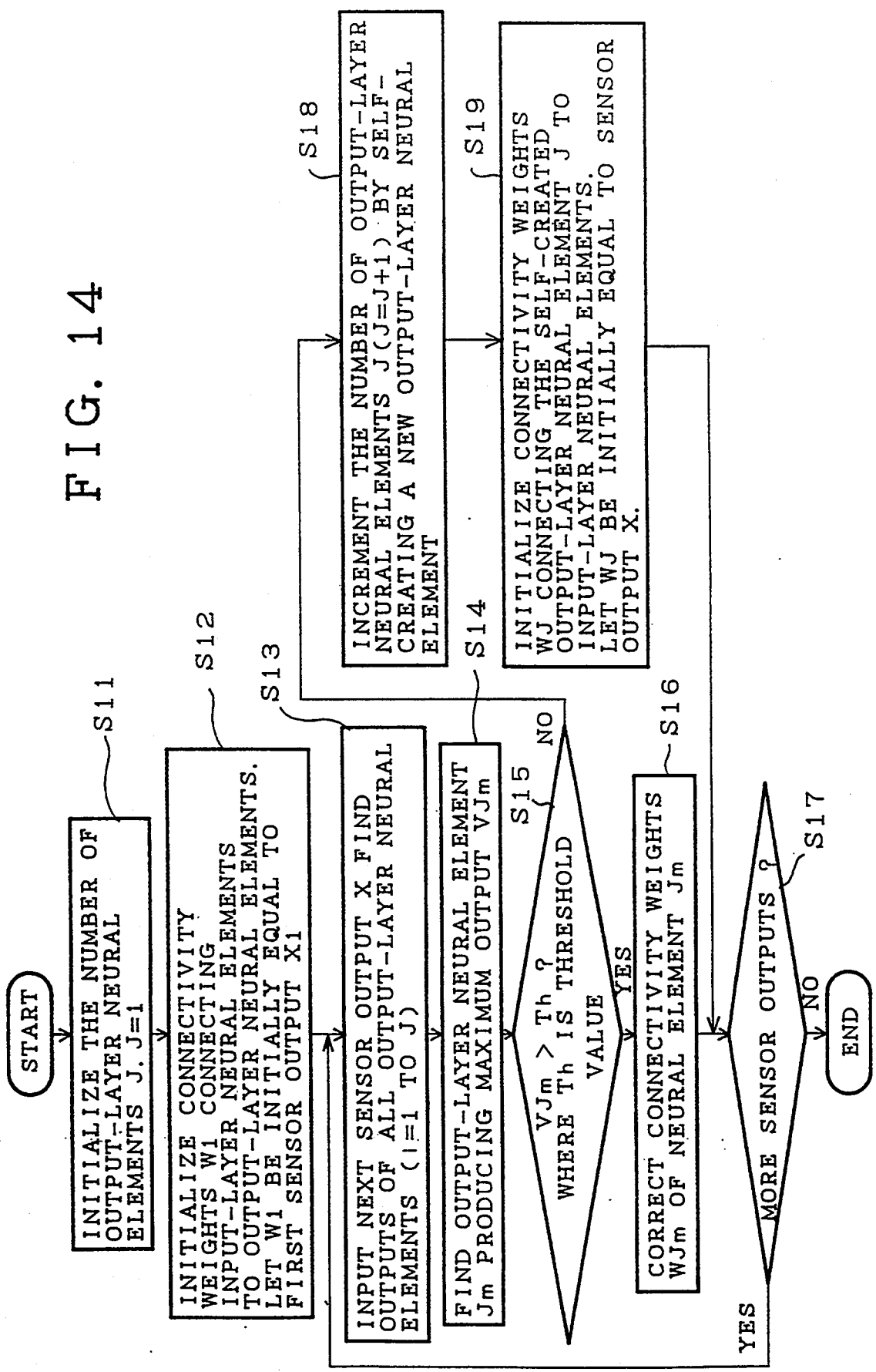
FIG. 14 is an explanatory flowchart showing a learning algorithm adopted in the monitoring diagnostic apparatus implemented by the fourth embodiment.

First of all, at a step S11 shown in FIG. 14, the number of output-layer neural elements is initialized to unity. At a step S12, connectivity weights $W_1$ connecting the only one initial output-layer neural element is set to $x_1$, initial outputs of the sensors, where $W_1$ and $x_1$ are each a vector quantity. It should be noted that by the outputs of the sensors, outputs completing the preprocessing and normalization shown in FIGS. 1 and 7 are meant.

Subsequently, new outputs x of the sensors are input at a step S13. An output $V_j$ of an output-layer neural element j for the outputs x is computed at a step S14 typically as an inner product of the outputs x and connectivity weights $W_j$ given by Equation (7). At a step 15, the output $V_j$ is compared to a predetermined threshold value Th. If the output $V_j$ is found to be greater than the threshold value Th, an abnormality cause represented by the outputs x produced by the sensors is regarded as an abnormality cause represented by the neural element j in which case the flow of the algorithm continues to a step S16. At the step S16, the connectivity weights $W_j$ are corrected in accordance with Equation (8).

$$V_j = (X, W_j) \tag{7}$$

$$W_j = (X + n_j)/(n_j + 1) \tag{8}$$

where $n_j$ appearing in Equation (8) is the number of sensor-output sets assigned to output-layer neural elements j up to that point of time. After the connectivity weights $W_j$ are corrected, the algorithm checks, at a step S17, whether or not other outputs of the sensors to be supplied to the neural network apparatus 11 still exist. If no more outputs exist, the processing is ended. Otherwise, the processing returns to the step S13.

If the output $V_j$ is found to be smaller than the predetermined threshold value Th at the step S15, on the other hand, the processing continues to a step S18 at which the number of output-layer neural elements and an index J are each incremented by one by self-creating a new output-layer neural element. At a step S19, connectivity weights connecting the newly created output-layer neural element to the input-layer neural elements are initialized to the outputs x of the sensors produced at that time. Here, the self-created output-layer neural element is used to indicate a new abnormality cause.

Fifth Embodiment

Figure 15:
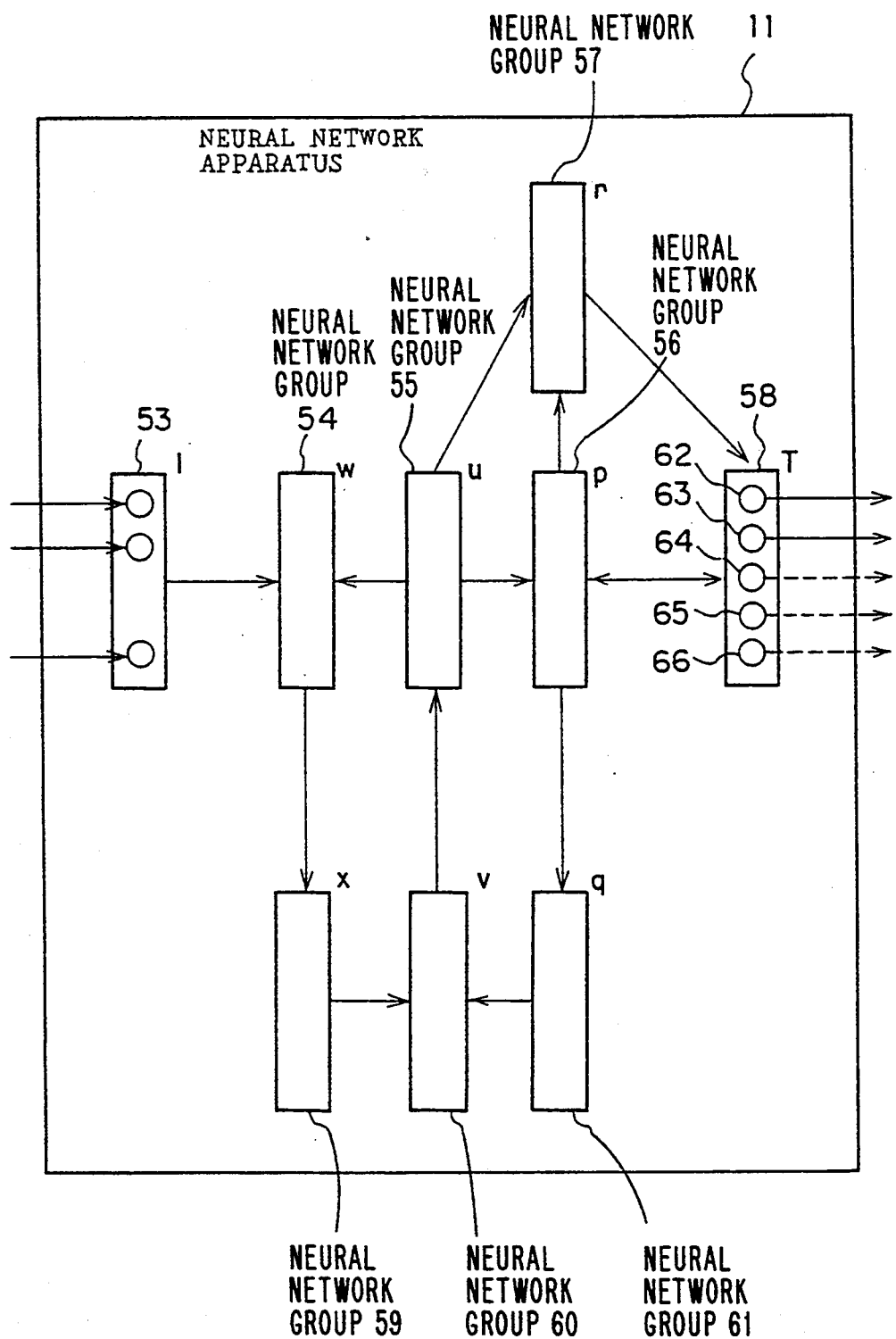
FIG. 15 is a diagram showing details of a neural network apparatus employed in a fifth embodiment implementing a monitoring diagnostic apparatus in accordance with the present invention.

FIG. 15 is a diagram showing details of a still another neural network apparatus 11 employed in a fifth embodiment implementing a monitoring diagnostic apparatus in accordance with the present invention. In the fifth embodiment, a configuration of the neural network apparatus 11 and a learning algorithm different from those for the embodiments shown in FIGS. 1 and 7 are employed. However, the processings such as the FFT, time averaging, normalization and preprocessing are the same.

After undergoing the FFT and normalization processings, the outputs of the acceleration and partial-discharge sensors are supplied to a neural-element group 53 of the input layer as shown in FIG. 15. The neural-element group 53 of the input layer is a buffer which forwards inputs supplied thereto as they are. Thereafter, the outputs of the sensors supplied to the neural-element group 53 of the input layer, which are output as they are, are in some cases expressed as a vector I. Reference numerals 54 to 61 are also neural-element groups having the same configuration as that denoted by reference numeral 53 even though the symbol $\bigcirc$ is omitted from some of them.

Viewed externally, the neural network apparatus 11 shown in FIG. 15 has almost the same functions as the fourth embodiment. To be more specific, as a result of learning from known spectra, abnormality causes 1 and 2 are assigned to, for example, neural elements 62 and 63, respectively. In this case, when an abnormality generated by the abnormality cause 1 is detected in the electrical equipment during operation, sensor outputs supplied to the neural network apparatus 11 cause the neural element 62 to produce a maximum output.

In addition, when an abnormality generated by an abnormality cause 3 not existing in the learning data of the abnormality causes 1 and 2 is detected in the electrical equipment during operation, connectivity weights in the neural network apparatus are corrected so that a new neural element 64 produces a maximum output. That is to say, in the event of an abnormality cause not even learned in the learning process, the neural network apparatus creates a new neural element 58 by itself which allows the abnormality cause to be identified.

The learning algorithm and behavior done during operation of the embodiment shown in FIG. 15 are exactly the same as those of the embodiments described earlier. To be more specific, the very same algorithm is used regardless of whether the neural network apparatus is in a learning process or operational. In the following description of the fifth embodiment, the algorithm is called the learning algorithm, a generic name. The neural-network groups 54 to 56 and 59 to 61 operate in accordance with Equations (9):

$$W_i = I_i + au_i \tag{9}$$

$$U_i = V_i/(e + |V|)$$

$$P_i = U_i + \sum_j g(Y_j)Z_{ji}$$

$$X_i = W_i/(e + |W|)$$

$$V_i = f(X_i) + bf(q_i)$$

$$q_i = P_i/(e + |P|)$$

where f(x) is given by Equation (10) as follows:

$$f(x) = \begin{cases} 0 \text{ if } 0 < x < \theta \\ \theta \text{ if } x > \theta \end{cases} \tag{10}$$

where a, b, e and $\theta$ appearing in Equations (9) and (10) are parameters and $I_i$ is the ith element of the vector I. Similarly, the subscript i appended to vectors W, u, P, x, V and q denotes the ith element of each of the vectors. The relations between outputs produced by the neural-element group 58 and connectivity weights connecting the neural-element groups 56 and 58 are given by Equations 11.

$$(d/dt)Z_{ji} = g(Y_j)[P_i - Z_{ji}] \tag{11}$$

$$(d/dt)Z_{ij} = g(Y_i)[P_j - Z_{ij}]$$

where $g(Y_j)$ appearing in Equation (11) is given by Equation (12). The neural-element group 57 is obtained by using Equation (13). c, d and $\rho$ are parameters. $Z_{ij}$ is connectivity weights in a direction from the neural-element group 56 to 58 whereas $Z_{ji}$ is connectivity weights in a direction from the neural-element group 58 to 56.

$$g(Y_j) = \begin{cases} d \text{ if } T_j = \max\{T_j\} \\ 0 \text{ otherwise} \end{cases} \tag{12}$$

-continued $$T_j = \sum_i P_i Z_{ij}$$

$$r_i = (u_i + CP_i)/(e + |u| + |CP|) \quad (13)$$

$$P/(e+|r|) > 1 \quad (14)$$

Figure 16:
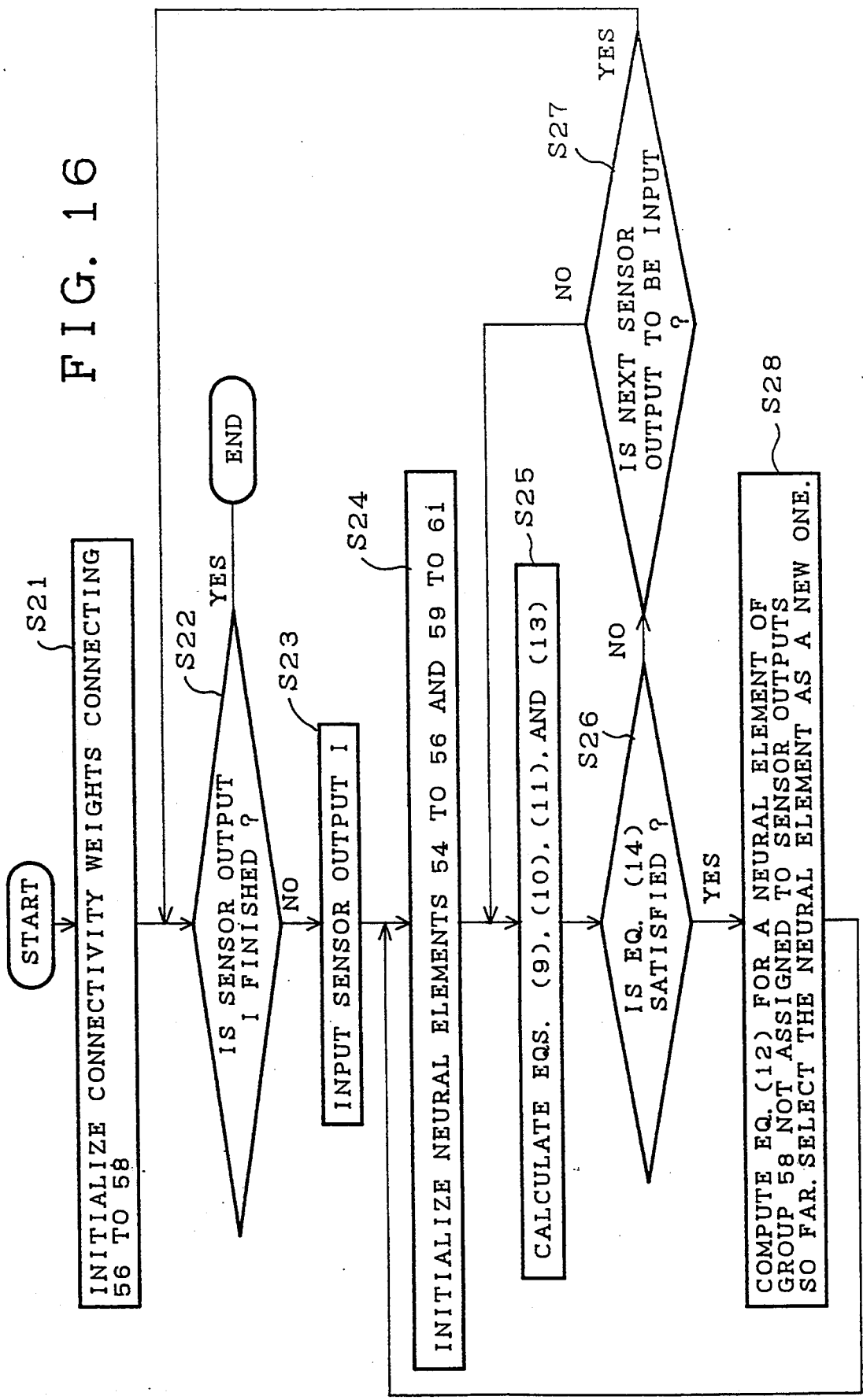
FIG. 16 is an explanatory flowchart showing a learning algorithm adopted in the monitoring diagnostic apparatus implemented by the fifth embodiment.

FIG. 16 is an explanatory flowchart showing the learning algorithm adopted in the monitoring diagnostic apparatus implemented by the fifth embodiment. First of all, at a step S21 shown in the figure, the connectivity weights $Z_{ij}$ and $Z_{ji}$ are initialized. Typically, small random numbers are taken as initial values. Subsequently, at a step S22, the algorithm checks whether or not all outputs I produced by the sensors have been processed. If not, the flow goes to a step S23 at which sensor outputs I are input. The neural-element groups 54 to 56 and 59 to 61 are then initialized, typically, to zeros in this case. At a step 25, the right sides of Equations (9), (10), (11) and (13) are calculated. Next, at a step S26, the processing examines whether or not a condition expressed by Equation (14) is satisfied. If not satisfied, the flow goes to a step 27 at which the processing determines whether or not next sensor outputs are to be input. If next sensor outputs are to be input, the processing returns to the step 22. Otherwise, the flow again goes to the step 25 at which the right sides of Equations (9), (10), (11) and (13) are calculated. That is to say, if the processings of the step 25 are not carried out, next sensor outputs are input.

If the condition expressed by Equation (14) is found to be satisfied at the step S26, on the other hand, the processing continues to a step 28 at which a neural element not chosen so far for the current sensor outputs is selected among the neural elements belonging to the group 58 shown in FIG. 15. If all the neural elements of the group 58 have been selected before, a new neural element is self-created and chosen for the current sensor outputs. For example, neural elements 62 and 63 of the group 58 shown in FIG. 15 have been selected so far. Therefore, a new neural element 64 is self-created and selected for the current sensor outputs.

In the above description, the term "self-creation" is used. In actuality, however, an available neural element is used instead of self-creating a new one. That is to say, when implementing the embodiment by means of a program, sufficient neural elements are provided in the group 58 in advance as array variables. Some neural elements 62 to 64 are then selected. Instead of self-creation later on, one of the remaining neural elements is used.

In the embodiments described above, the acceleration sensors 7 and the partial-discharge sensors 20 are attached to a circuit breaker. The processings carried out by the processors 8 to 11 and 21 to 23 can also be implemented by executing programs on personal computers equipped with dedicated hardware.

A circuit breaker is taken as an electrical-equipment object of the embodiments in the above description. However, objects of the embodiments are not limited to circuit breakers. The embodiments can also be applied to electrical equipment such as switches, disconnecting switches, voltage transformers, current transformers, general transformers, bus bars, insulation meters, generators, rotary machines, oil-insulated electrical equipment, air-insulated electrical equipment, vacuum-insulated electrical equipment and solid-insulated electrical equipment.

What is claimed is:

1. A monitoring diagnostic apparatus for detecting abnormalities occurring in a monitored object comprising:

an acceleration sensor installed at said monitored object for measuring an acceleration of the monitored object resulting from vibration occurring in said monitored object and outputting an acceleration signal representing said acceleration;

a signal processing means for executing predetermined signal processing on said acceleration signal;

a neural network for identifying an abnormality and determining an abnormality cause thereof by inputting a signal undergoing said signal processing at said signal processing means:

wherein said neural network comprises a plurality of neural elements constituting an input layer, a plurality of neural elements constituting an output layer and connectivity weights connecting said input-layer neural elements to said output-layer neural elements, and wherein said input-layer neural elements are used for inputting signals generated by said signal processing means;

wherein the values of said connectivity weights of said neural network are determined in a learning process so that a specific output-layer neural element produces a maximum output corresponding to an already known cause of an abnormality occurring in said monitored object; and wherein in the event of an abnormality occurring in said monitored object whose cause is not known in advance, said neural network undergoes a learning process for self-creating a new output-layer neural element and determining the values of said connectivity weights so that said new output-layer neural element produces a maximum output.

* * * * *